Nov. 20, 1956   L. H. FLORA   2,771,113
SHEET METAL LOCK NUT WITH SPRING LOCKING ARM
Filed Aug. 18, 1953
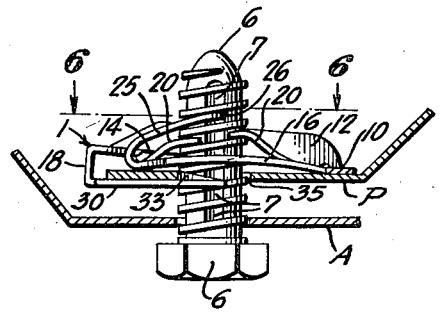
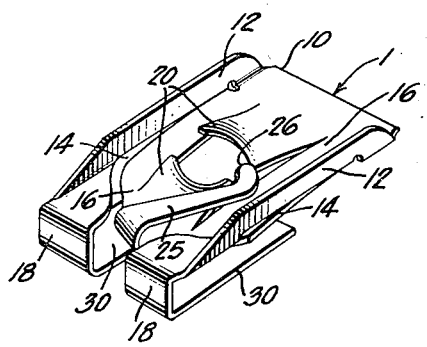
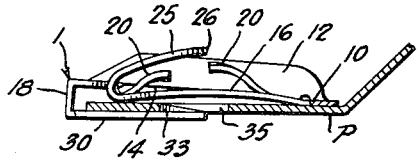
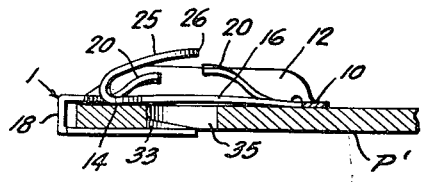
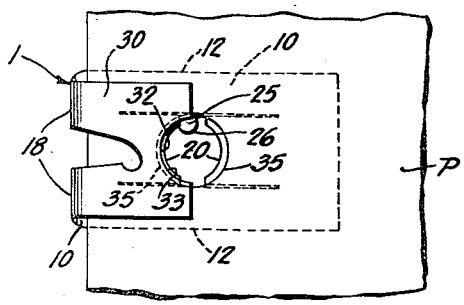
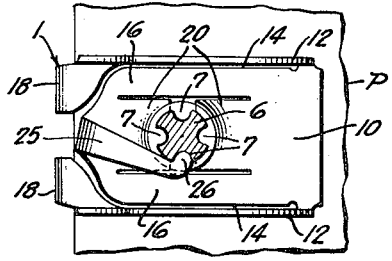
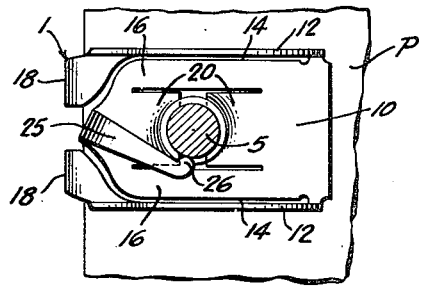
INVENTOR
LAURENCE H. FLORA
BY
ATTORNEY

United States Patent Office 2,771,113
Patented Nov. 20, 1956

2,771,113

SHEET METAL LOCK NUT WITH SPRING LOCKING ARM

Laurence H. Flora, Cleveland, Ohio, assignor to Tinnerman Products, Inc., Cleveland, Ohio, a corporation of Ohio Application August 18, 1953, Serial No. 374,950

4 Claims. (Cl. 151—11)

This invention relates in general to fastening devices and deals, more particularly, with improvements in fasteners comprising sheet metal nuts provided with means for effecting an automatic self-locking thereof in fastened engagement wih a bolt or screw.

A primary object of the invention is to provide an improved sheet metal lock nut which is provided with relatively high resistance against loosening by an auxiliary spring arm, or the like, having a locking edge portion on its free end, and which is adapted to be tensioned in fastening position with said locking edge portion in tangential engagement with the root of the bolt or screw and in binding engagement in the grooves between the thread convolutions on the bolt or screw.

Another object of the invention is to provide such a sheet metal lock nut in which the locking edge portion on the spring arm, or the like, includes an inwardly projecting pawl or locking lug whereby the nut is adapted for use with a bolt or screw having a series of indents or notches along the length thereof and said pawl or lug is receivable in any one of said notches to provide a positive lock of the nut in applied position on the bolt or screw.

An additional object of the invention is to provide an improved sheet metal lock nut embodying one or more or all of the foregoing described features of construction, and which, otherwise, is provided with attaching means whereby the nut is adapted to be attached in fastening position on a part preparatory to the application of the cooperating bolt or screw thereto, and further, with said attaching means so constructed as to adapt the nut for attachment to supporting parts of different thicknesses.

A further object of the invention, therefore, is to provide an attachable lock nut, of the kind described, which is adapted to be attached to supporting parts of considerably different thicknesses, and which is formed in a simplified sheet metal construction comprising a pair of spaced body portion for embracing an apertured supporting part together with a resilient floating base on one of said body portions cooperating with the other body portion in a manner to adapt the fastener to the thickness of such part in order to seat the fastener thereon in its most effective and proper fastening position.

Another object of the invention is to provide an attachable lock nut of this character in which the attaching portion includes a locking detent serving as an indexing or positioning means that is easily and quickly applied to the aperture in the supporting part through the medium of a sight opening adjacent said detent for guiding the fastener to attached position.

A further object is to provide an attachable lock nut of this kind having such indexing means arranged to center the fastener in attached position over a stud receiving opening in the supporting part and otherwise lock the fastener automatically in such attached fastening position.

Further objects and advantages, and other new and useful features in the construction, arrangement and general combination of elements in the improved lock nut of the invention will be apparent as the following description proceeds with reference to the accompanying drawings, for purposes of illustration but not of limitation, in which like reference characters designate like parts throughout, and in which:

Fig. 1 is a vertical sectional view through an assembly of superposed apertured parts shown in position to be secured by a bolt and sheet metal lock nut in accordance with the invention;

Fig. 2 is a perspective view of the sheet metal lock nut shown employed in Fig. 1;

Fig. 3 is a sectional view showing the lock nut in Figs. 1 and 2 as attached to a relatively thin supporting part, represented in section;

Fig. 4 is a similar view showing the same fastener as attached to a relatively thick supporting part;

Fig. 5 is a bottom plan view of Fig. 3;

Fig. 6 is a sectional view along line 6—6 of Fig. 1, looking in the direction of the arrows, and shows the fastener in top plan in locking engagement with a special bolt or screw having a series of notches along the length thereof; and, Fig. 7 is a view similar to Fig. 6 showing the fastener as secured with a conventional bolt or screw in a binding thread locking action therewith.

Sheet metal lock nuts in accordance with the invention are provided from any suitable sheet metal material, preferably tempered spring metal or cold rolled metal having spring-like characteristics. The fasteners are most economically produced from generally rectangular blanks obtained from standard sheet metal strip stock with little loss or waste of material. In the present disclosure, the fastener is shown as provided with a floating, resilient base, serving as a yieldable take-up means which adapts the lock nut for attachment to apertured plates, panels, or other supporting parts of different thicknesses, together with attaching means including a locking detent serving as an indexing or positioning means and an adjacent sight opening which facilitates application of the fastener to attached fastening position on an apertured supporting part. While the invention is disclosed in connection with attachable nut devices, it will be appreciated that the invention is equally adapted for various other applications and uses wherein the fasteners are employed as ordinary lock nuts without attaching means or which, otherwise, are adapted for attachment in self-sustained fastening position on a supporting part in any suitable way.

Referring now, more particularly, to the drawings, there is disclosed one form of the improved lock nut of the invention, designated generally 1, which is constructed from a suitable section of sheet metal strip material provided with a U-shaped bend defining a body portion 10 and a return bent body portion 30. These body portions 10, 30, are spaced apart a predetermined distance corresponding to the range of thickness of the parts with which the fastener is intended for use. The body portion 10 is formed with upturned sides defining longitudinal side flanges 12, and is provided with a pair of longitudinal slits 14 adjacent said flanges 12 defining a floating base 16 between said side flanges 12 and the adjacent U-shaped bight portions 18 which connect the body portions 10, 30, in predetermined spaced relation, as aforesaid. The floating base 16 is free at its inner end and is bent in generally bowed or arcuate form to extend, in its normal untensioned relation, into the space between said spaced body portions 10, 30, as best seen in Figs. 1 and 3.

The floating base 16 of the lock nut is provided with a central thread opening defining means for threadedly engaging the associated bolt or screw. Preferably such a thread opening is defined by a pair of cooperating tongues 20, or the like, provided by a pair of spaced parallel slits on opposite sides of an aperture forming the thread opening for the bolt or screw. The thread engaging tongues 20 illustrate only one form of such thread engaging means which may be employed, and it is to be understood that the present invention is not limited in any manner or form to the specific construction of such thread engaging means 20, but rather, contemplates also, any other related form of thread engaging tongues or equivalent thread engaging means.

The floating base 16 carried by the body portion 10 is provided on its free end with an integral extension in the form of a spring arm or finger 25 which is stamped from the material of the adjacent U-shaped bight portion of the fastener and the body portion 30, as seen in Fig. 5. The integral spring arm 25 is provided as a strip-like element having a rounded lug or tab 26 projecting inwardly from the inner edge thereof, and preferably adjacent the extremity of said arm 25. The arm 25, thus provided, is return bent over the floating base 16 in generally parallel and spaced relation thereto in a manner whereby the edge of said arm 25 is tangential to the thread opening between the extremities of the tongues 20. In this relation, the rounded lug or tab 26 on said spring arm 25 is located adjacent said thread opening between the tongues 20 with the edge of said lug or tab 26 adapted for tangential engagement with the bolt or screw applied to threaded engagement with said tongues 20.

The resilient arm 25 is so bent that the inwardly projecting lug or tab 26 thereon lies normally in the path of the passage of the bolt or screw in threaded engagement with the tongues 20 such that said arm 25 and lug 26 must be forced outwardly by said bolt or screw as it is turned to its applied position with the tongues 20 or other thread engaging means.

In this regard, the edge of the lug or tab 26 defines a relatively sharp cutting edge adapted to provide a thread lock on a standard bolt or screw, Fig. 7, by a cutting action between the thread convolutions thereon and into the root thereof, or otherwise, defines a pronounced locking pawl when used with a special groove bolt 6, Figs. 1 and 6, having a series of correspondingly shaped indents or notches 7 adapted to receive said lug 26 in any applied position of the bolt or screw 6 to provide a positive lock thereon.

The body portion 30 of the fastener 1 is carried by the generally U-shaped side portions 18 and terminates substantially below and in line with the thread opening between the tongues 20 in the opposing body portion 10. As best seen in Fig. 5, the extremity of the body portion 30 is recessed in a manner to provide a generally arcuate sight opening 32 and an adjacent upstanding locking projection or detent 33 formed by a bent marginal end portion of said sight opening 32. Preferably, said detent 33 is thus formed from a marginal edge portion of the sight opening 32 to define a generally semicircular indexing or positioning element which snugly engages the wall of the bolt opening 35 in a supporting part to retain the fastening device in attached position thereon. The locking detent 33 preferably has its upper edge surface tapered generally downwardly and outwardly toward the free end of the body portion 30 to define an inclined cam surface. The inclined cam surface of the locking detent 33 provides a flared entrance to the space between the body portions 10, 30, which facilitates the initial application thereof to a part P by causing a gradual outward camming of said detent 33 as necessary to clear the edge of said part P easily and quickly. When the fastener is initially applied, the sight opening 32, Fig. 5, at the free end of body portion 30 leaves the bolt passage 35 in the part P uncovered and fully visible such that the fastener may be guided readily, in the least amount of time and effort, to its fully attached position in which the locking detent 33 snaps into said bolt opening 35 as shown in Figs. 3 and 4. The locking detent 33 preferably is semicircular and thereby snugly engages a material edge portion of the circular bolt opening 35 to lock the fastener in attached position while otherwise leaving a sufficiently large passage for the bolt or screw fastener 5, Fig. 7, or 6, Figs. 1 and 6, to be applied to the thread engaging tongues 20 to secure a member A to said part P in a completed fastening installation as seen in Fig. 1.

Referring to Figs. 1, 3, and 4, it will be understood that the fastener 1 thus provided with the yieldable or floating base 16 extending free between the spaced body portions 10, 30, is adapted for ready attachment to the relatively thin part P, Figs. 1 and 3, or the relatively thick part P', Fig. 4, or any other part having a thickness within the range of use of the fastener. In the application of the fastener to the position shown in Fig. 3, the inclined surface of detent 33 cams outwardly against an edge of said part P while the floating base 16 cams against the opposing edge of said part and gradually yields as necessary in accordance with the thickness of the part to permit said part to be fully received between the spaced body portions 10, 30, of the fastener. In any case, the floating base 16 and the opposing body portion 30 engage opposite faces of the part P to retain the fastener in the attached fastening position, as shown in Figs. 1 and 3. The floating base 16, regardless of the thickness of the supporting part, automatically seats evenly and uniformly on said part in a manner whereby the thread engaging tongues 20 are positioned for application of the associated bolt or screw thereto in a direction generally normal to said floating base 16 and at right angles to the part A secured in the most effective and proper manner.

The improved fastener of the invention, accordingly, has a wide range of application to parts of different thicknesses by virtue of the floating base 16 which extends free between the spaced body portions 10, 30, to serve as a yieldable take-up means which adapts the fastener for attachment to a part of any particular thickness within the range intended. In any case, the body portion 30 is firmly and rigidly seated against one side of the engaged part while the floating base 16 pivots relatively to the body portion 10 as necessary to seat on the opposite side of said part in the most effective manner in applied fastening position, as aforesaid. At the same time, the locking detent 33 on the body portion 30 snaps into and engages the adjacent wall of the bolt opening 35 in the part P, Fig. 3, or P', Fig. 4, to lock the fastener in such applied fastening position.

The thread engaging elements 20 are best provided from the sheet metal material of the floating base 16 by an aperture intermediate spaced parallel slits which form cooperating tongues, or the like, having spaced extremities lying on a helix and defining the desired thread or thread opening corresponding substantially to the root of the bolt or screw 5 or 6 for threadedly engaging the thread thereof. Said tongues 20, otherwise, are preferably formed to project out of the plane of the base 16 and are bent lengthwise in substantial ogee formation to provide for the maximum strength obtainable to withstand the tightening action of the bolt or screw 5 or 6 as it is advanced to its applied fastening position.

Such thread engaging means may be pressed, stamped, extruded, or otherwise provided on the fastener base 16 in any suitable form or construction so long as the same threadedly engage with the thread of the bolt or screw 5 or 6 and, in this relation, the present invention fully contemplates the provision of such thread engaging means in various other similar and related forms, as in the manner of a keyhole type of thread opening, or a perforated protuberance which is pressed from the sheet metal and shaped to provide a helical thread or thread opening, or otherwise has the wall thereof tapped to provide a plurality of threads for threadedly engaging the bolt or screw. However, such thread engaging means prepared in the form of cooperating, yieldable tongues 20 as shown, are possessed of unusual inherent strength and will not collapse or pull through when the associated bolt or screw is tightened, nor loosen under continuous strain and vibration in the completed installation. This takes place by reason of the fact that the sheet metal material from which such tongues 20 are formed is of less thickness than the pitch or spacing between adjacent thread convolutions of the bolt or screw 5 or 6, wherefore the extremities of said tongues 20 tend, more effectively, to move toward each other and dig into the grooves intermediate adjacent thread convolutions of the bolt or screw when tightened and otherwise become embedded in the root thereof in locked, frictional fastening engagement therewith.

In the present example, the tongues 20 are shown as extending out of the plane of the base 16 in substantial ogee formation and provided preferably with arcuately notched extremities, forming substantial biting jaws adapted to cut into the root of the bolt or screw 5 or 6 and the adjacent thread surfaces thereon in a thread locking relation therewith in the most effective manner. The return bent locking arm 25 on said floating base 16 cooperates with said tongues 20 in such threaded engagement with the conventional bolt or screw 5, Fig. 7, or the special bolt or screw 6, Figs. 1 and 6. In either case, the inwardly projecting lug or tab 26 on the locking arm 25 lies in the path of the bolt or screw 5 or 6 as it passes between said tongues 20 in threaded engagement therewith, whereupon the bolt or screw 5 or 6 forces said arm 25 to flex outwardly as necessary to permit the bolt or screw to pass, thereby setting up a pronounced inwardly directed spring force on said arm 25. The edge of said lug or tab 26 is in tangential engagement with the bolt or screw 5 or 6 under such pronounced spring force on the arm 25, and when a standard bolt or screw 5, Fig. 7, is employed, said edge of the lug or tab 26 provides a cutting action in the grooves between the thread convolutions on said bolt or screw 5 to produce an automatic thread locking action thereon in conjunction with the thread locking action provided by the tongues 20, as aforesaid.

Likewise, when a grooved bolt 6, Figs. 1 and 6, is employed, the edge of said lug or tab 26 is biased inwardly under the pronounced spring force set up on said arm 25, such that said lug or tab 26 is adapted to snap into any of the indents or notches 7 on said bolt 6, in the manner of a pawl, to provide a positive lock on said bolt or screw 6 in any applied position thereof.

The fastener 1 preferably is constructed of relatively thin sheet metal the thickness of which is selected according to service requirements and the predetermined size of the parts to be secured. The fastener is most effective when provided of spring metal suitably tempered and otherwise treated to give the desired toughness and hardness, particularly in the case of devices intended for heavy duty applications. A cheap and highly satisfactory fastener in accordance with the invention may be provided from cold rolled metal such as cold rolled steel which is untempered but of a spring metal nature and capable of providing an effective and reliable fastener, as and for the purposes described.

While the invention has been described in detail with a specific example, such example is intended as an illustration only inasmuch as the invention fully contemplates various modifications which may be provided without departing from the spirit and scope of the invention.

What is claimed is:

1. A fastener comprising a piece of sheet metal having a return bent portion defining a pair of spaced slightly converging body portions extending in the same general direction and adapted to receive therebetween in attached relation any of several apertured parts of different thicknesses between the limits of a thin part of considerably less thickness than the spacing of said body portions to a thick part having a thickness slightly less than the spacing of said body portions, one of said body portions being provided with a yieldable base stamped therefrom having a free end extending toward said return bent portion of the fastener, said yieldable base having an opening and thread engaging means on the periphery of said opening for threadedly engaging a bolt or screw, said yieldable base being bent bodily inwardly toward the other body portion such that said free end thereof is spaced from said other body portion a distance less than the thickness of any part with which the fastener is intended to be used, said inwardly bent yieldable base being adapted to yield in accordance with the thickness of the part to which the fastener is applied to cooperate with said other body portion of the fastener in engaging opposite sides of said part in the attached position of the fastener thereon, said yieldable base in such attached position of the fastener being adapted to lie substantially parallel to the part to which the fastener is applied with said other body portion in surface engagement with said part regardless of the thickness of said part and with said thread engaging means on said yieldable base in position for even and uniform threaded engagement with a bolt or screw to be applied to said thread engaging means with the axis of said bolt or screw in normal relation to said part, said return bent portion and said other body portion having a partially severed area therein extending lengthwise of the fastener from the free end of said yieldable base and defining an elongate spring arm integral with said free end of said yieldable base, said spring arm being return bent in overlying generally parallel relation to said yieldable base and having its inner longitudinal edge adjacent said opening in said base for engaging a bolt or screw in cooperation with said thread engaging means.

2. A fastener comprising a piece of sheet metal having a return bent portion defining a pair of spaced slightly converging body portions extending in the same general direction and adapted to receive therebetween in attached relation any of several apertured parts of different thicknesses between the limits of a thin part of considerably less thickness than the spacing of said body portions to a thick part having a thickness slightly less than the spacing of said body portions, one of said body portions being provided with a yieldable base stamped therefrom having a free end extending toward said return bent portion of the fastener, said yieldable base having an opening and thread engaging means on the periphery of said opening for threadedly engaging a bolt or screw, said yieldable base being bent bodily inwardly toward the other body portion such that said free end thereof is spaced from said other body portion a distance less than the thickness of any part with which the fastener is intended to be used, said inwardly bent yieldable base being adapted to yield in accordance with the thickness of the part to which the fastener is applied to cooperate with said other body portion of the fastener in engaging opposite sides of said part in the attached position of the fastener thereon, said yieldable base in such attached position of the fastener being adapted to lie substantially parallel to the part to which the fastener is applied with said other body portion in surface engagement with said part regardless of the thickness of said part and with said thread engaging means on said yieldable base in position for even and uniform threaded engagement with a bolt or screw to be applied to said thread engaging means with the axis of said bolt or screw in normal relation to said part, said return bent portion and said other body portion having a partially severed area therein extending lengthwise of the fastener from the free end of said yieldable base and defining an elongate spring arm integral with said free end of said yieldable base, said spring arm being return bent in overlying generally parallel relation to said yieldable base and having its inner longitudinal edge adjacent said opening in said base for engaging a bolt or screw in cooperation with said thread engaging means, said other body portion having an opening concentric with said thread engaging means and of such size as to permit free passage of said bolt or screw, and an inwardly projecting detent adjacent said latter opening, said detent being receivable in the aperture in said part to retain the fastener in said attached position on said part.

3. A fastener for a bolt or screw having a series of notches on its periphery at spaced points along the length thereof, said fastener comprising a piece of sheet metal having a return bent portion defining a pair of spaced slightly converging body portions extending in the same general direction and adapted to receive therebetween in attached relation any of several apertured parts of different thicknesses between the limits of a thin part of considerably less thickness than the spacing of said body portions to a thick part having a thickness slightly less than the spacing of said body portions, one of said body portions being provided with a yieldable base stamped therefrom having a free end extending toward said return bent portion of the fastener, said yieldable base having an opening and thread engaging means on the periphery of said opening for threadedly engaging a bolt or screw, said yieldable base being bent bodily inwardly toward the other body portion such that said free end thereof is spaced from said other body portion a distance less than the thickness of any part with which the fastener is intended to be used, said inwardlly bent yieldable base being adapted to yield in accordance with the thickness of the part to which the fastener is applied to cooperate with said other body portion of the fastener in engaging opposite sides of said part in the attached position of the fastener thereon, said yieldable base in such attached position of the fastener being adapted to lie substantially parallel to the part to which the fastener is applied with said other body portion in surface engagement with said part regardless of the thickness of said part and with said thread engaging means on said yieldable base in position for even and uniform threaded engagement with said bolt or screw to be applied to said thread engaging means with the axis of said bolt or screw in normal relation to said part, said return bent portion and said other body portion having a partially severed area therein extending lengthwise of the fastener from the free end of said yieldable base and defining an elongate spring arm integral with said free end of said yieldable base, said spring arm having an inwardly projecting lug on the inner edge thereof and being return bent in overlying generally parallel relation to said yieldable base with said inwardly projecting lug thereon adjacent said opening in said base in position to seat in any of said notches on said bolt or screw to provide a positive lock thereon in cooperation with said thread engaging means.

4. A fastener for a bolt or screw having a series of notches on its periphery at spaced points along the length thereof, said fastener comprising a piece of sheet metal having a return bent portion defining a pair of spaced slightly converging body portions extending in the same general direction and adapted to receive therebetween in attached relation any of several apertured parts of different thicknesses between the limits of a thin part of considerably less thickness than the spacing of said body portions to a thick part having a thickness slightly less than the spacing of said body portions, one of said body portions being provided with a yieldable base stamped therefrom having a free end extending toward said return bent portion of the fastener, said yieldable base having an opening and thread engaging means on the periphery of said opening for threadedly engaging a bolt or screw, said yieldable base being bent bodily inwardly toward the other body portion such that said free end thereof is spaced from said other body portion a distance less than the thickness of any part with which the fastener is intended to be used, said inwardly bent yieldable base being adapted to yield in accordance with the thickness of the part to which the fastener is applied to cooperate with said other body portion of the fastener in engaging opposite sides of said part in the attached position of the fastener thereon, said yieldable base in such attached position of the fastener being adapted to lie substantially parallel to the part to which the fastener is applied with said other body portion in surface engagement with said part regardless of the thickness of said part and with said thread engaging means on said yieldable base in position for even and uniform threaded engagement with said bolt or screw to be applied to said thread engaging means with the axis of said bolt or screw in normal relation to said part, said return bent portion and said other body portion having a partially severed area therein extending lengthwise of the fastener from the free end of said yieldable base and defining an elongate spring arm integral with said free end of said yieldable base and having an inwardly projecting lug on the inner edge thereof, said spring arm being return bent in overlying generally parallel relation to said base with said inwardly projecting lug thereon adjacent said opening in said base in position to seat in any of said notches on said bolt or screw to provide a positive lock thereon in cooperation with said thread engaging means, said other body portion having an opening concentric with said thread engaging means and of such size as to permit free passage of said bolt or screw, and an inwardly projecting detent adjacent said latter opening, said detent having a surface sloping downwardly toward the free end of said other body portion for facilitating application of the fastener to said part, and said detent being receivable in the aperture in said part to retain the fastener in said attached position on said part.

References Cited in the file of this patent

UNITED STATES PATENTS

| | | |
|---|---|---|
| 1,019,686 | Miller | Mar. 5, 1912 |
| 1,364,553 | Hilsabeck | Jan. 4, 1921 |
| 2,342,170 | Tinnerman | Feb. 22, 1944 |
| 2,398,827 | Graham et al. | Apr. 23, 1946 |
| 2,581,481 | Hartman et al. | Jan. 8, 1952 |

FOREIGN PATENTS

| | | |
|---|---|---|
| 4,391 of 1912 | Great Britain | Feb. 21, 1912 |